United States Patent
Osumi et al.

(10) Patent No.: US 11,460,606 B2
(45) Date of Patent: Oct. 4, 2022

(54) PRECIPITATION INDEX ESTIMATION APPARATUS

(71) Applicant: TOYOTA JIDOSHA KABUSHIKI KAISHA, Toyota (JP)

(72) Inventors: Ryota Osumi, Nagoya (JP); Noriaki Saito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 16/509,712

(22) Filed: Jul. 12, 2019

(65) Prior Publication Data

US 2020/0103555 A1 Apr. 2, 2020

(30) Foreign Application Priority Data

Sep. 28, 2018 (JP) .............................. JP2018-184595

(51) Int. Cl.
*G01W 1/14* (2006.01)
*G07C 5/00* (2006.01)
*B60S 1/06* (2006.01)

(52) U.S. Cl.
CPC ............... *G01W 1/14* (2013.01); *G07C 5/008* (2013.01); *B60S 1/06* (2013.01)

(58) Field of Classification Search
CPC ...................................................... G01W 1/14
USPC ............................................................. 702/3
See application file for complete search history.

(56) References Cited

U.S. PATENT DOCUMENTS

| 8,630,784 | B2 * | 1/2014 | Bai ....................... H04L 1/0002 701/102 |
| 2002/0121972 | A1 * | 9/2002 | Schofield .............. B60S 1/0888 340/425.5 |
| 2005/0174082 | A1 | 8/2005 | Tanida |
| 2008/0030159 | A1 * | 2/2008 | Hiramoto .............. B60S 1/0818 318/483 |
| 2008/0030370 | A1 * | 2/2008 | Doyle .................. G08G 1/0962 340/905 |
| 2009/0175489 | A1 * | 7/2009 | Harrington .......... G06K 9/3233 382/100 |

(Continued)

FOREIGN PATENT DOCUMENTS

| CN | 102782738 A | 11/2012 |
| CN | 107918311 A | 4/2018 |

(Continued)

OTHER PUBLICATIONS

Office Action Issued to U.S. Appl. No. 16/509,730 dated Apr. 27, 2021, citing references AA and AB therein.

(Continued)

*Primary Examiner* — Ricky Go
(74) *Attorney, Agent, or Firm* — Oblon, McClelland, Maier & Neustadt, L.L.P.

(57) ABSTRACT

A precipitation index estimation apparatus includes a data collection unit and an estimation processing unit. The data collection unit is configured to collect rainfall amount data that is detected by a rainfall amount sensor in one or more vehicles positioned in a predetermined area within a predetermined period. The estimation processing unit is configured to estimate a precipitation index indicating an intensity of precipitation in the predetermined area within the predetermined period, based on the collected rainfall amount data.

3 Claims, 13 Drawing Sheets

(56) References Cited

U.S. PATENT DOCUMENTS

| | | | |
|---|---|---|---|
| 2011/0054794 A1 | 3/2011 | Teder | |
| 2012/0310536 A1* | 12/2012 | Katayama | G01C 21/3461 |
| | | | 702/3 |
| 2014/0002277 A1 | 1/2014 | Fulger et al. | |
| 2015/0203107 A1 | 7/2015 | Lippman | |
| 2016/0297406 A1 | 10/2016 | Jansen et al. | |
| 2018/0099646 A1* | 4/2018 | Karandikar | B60W 40/068 |
| 2019/0377339 A1* | 12/2019 | Nath | B60W 10/18 |

FOREIGN PATENT DOCUMENTS

| | | |
|---|---|---|
| JP | 09-189773 A | 7/1997 |
| JP | 2005-207863 A | 8/2005 |
| JP | 2012-215969 | 11/2012 |
| JP | 2015-025718 A | 2/2015 |
| JP | 2017-083458 A | 5/2017 |
| JP | 2018-109820 A | 7/2018 |
| JP | 2020-006886 A | 1/2020 |

OTHER PUBLICATIONS

Notice of Allowance Issued to U.S. Appl. No. 16/509,730 dated Feb. 24, 2022.

Office Action Issued to U.S. Appl. No. 16/509,730 dated Nov. 17, 2021.

Office Action Issued to U.S. Appl. No. 16/509,555 dated Apr. 19, 2022.

Supplemental Notice of Allowability dated Apr. 7, 2022 in related U.S. Appl. No. 16/509,730.

* cited by examiner

FIG. 5

| AREA ID (MESH CODE) | VEHICLE | ... | 15:00:00 | 15:00:20 | 15:00:40 | 15:01:00 | 15:01:20 | 15:01:40 | 15:02:00 | 15:02:20 | 15:02:40 | 15:03:00 | 15:03:20 | 15:03:40 | ... |
|---|---|---|---|---|---|---|---|---|---|---|---|---|---|---|---|
| XXXXXX | A | ... | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | ... |
| XXXXXX | B | ... | HIGH SPEED | HIGH SPEED | HIGH SPEED | HIGH SPEED | HIGH SPEED | HIGH SPEED | HIGH SPEED | HIGH SPEED | HIGH SPEED | LOW SPEED | LOW SPEED | LOW SPEED | ... |
| XXXXXX | C | ... | HIGH SPEED | HIGH SPEED | HIGH SPEED | LOW SPEED | LOW SPEED | LOW SPEED | LOW SPEED | LOW SPEED | LOW SPEED | INTER-MITTENT | INTER-MITTENT | INTER-MITTENT | ... |
| XXXXXX | D | ... | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | ... |
| XXXXXX | E | ... | | | | | | | | | | HIGH SPEED | HIGH SPEED | HIGH SPEED | ... |

FIG. 6

| AREA ID (MESH CODE) | VEHICLE | STOP MODE | INTERMITTENT MODE | LOW SPEED MODE | HIGH SPEED MODE |
|---|---|---|---|---|---|
| XXXXXX | A | 0 | 0 | 0 | 12 |
| XXXXXX | B | 0 | 0 | 3 | 9 |
| XXXXXX | C | 0 | 3 | 6 | 3 |
| XXXXXX | D | 0 | 0 | 0 | 12 |
| XXXXXX | E | 0 | 0 | 0 | 3 |
| COUNT | | 0 | 3 | 9 | 39 |
| PROPORTION | | 0.000 | 0.059 | 0.176 | 0.765 |

FIG. 7

| | STOP MODE | INTERMITTENT MODE | LOW SPEED MODE | HIGH SPEED MODE |
|---|---|---|---|---|
| ESTIMATED LEVEL OF PRECIPITATION | NO RAIN | LOW | SLIGHTLY HEAVY | HEAVY |

|  | STOP MODE | INTERMITTENT MODE | LOW SPEED MODE | HIGH SPEED MODE |
|---|---|---|---|---|
| WEIGHT FOR CALCULATE INDEX | 0 | 2 | 6 | 10 |

| AREA ID (MESH CODE) | VEHICLE | STOP MODE | INTERMITTENT MODE | LOW SPEED MODE | HIGH SPEED MODE | OPERATION MODE FOR EACH VEHICLE |
|---|---|---|---|---|---|---|
| XXXXXX | A | 0 | 0 | 0 | 12 | HIGH SPEED MODE |
| XXXXXX | B | 0 | 0 | 3 | 9 | HIGH SPEED MODE |
| XXXXXX | C | 0 | 3 | 6 | 3 | LOW SPEED MODE |
| XXXXXX | D | 0 | 0 | 0 | 12 | HIGH SPEED MODE |
| XXXXXX | E | 0 | 0 | 0 | 3 | HIGH SPEED MODE |

FIG. 10

| AREA ID (MESH CODE) | VEHICLE | ... | 15:00:00 | 15:00:20 | 15:00:40 | 15:01:00 | 15:01:20 | 15:01:40 | 15:02:00 | 15:02:20 | 15:02:40 | 15:03:00 | 15:03:20 | 15:03:40 | ... |
|---|---|---|---|---|---|---|---|---|---|---|---|---|---|---|---|
| XXXXXX | A | ... | HIGH SPEED (42km/h) | HIGH SPEED (43km/h) | HIGH SPEED (41km/h) | HIGH SPEED (25km/h) | HIGH SPEED (0km/h) | HIGH SPEED (0km/h) | HIGH SPEED (0km/h) | HIGH SPEED (40km/h) | HIGH SPEED (42km/h) | HIGH SPEED (43km/h) | HIGH SPEED (41km/h) | HIGH SPEED (40km/h) | ... |
| XXXXXX | B | ... | HIGH SPEED (30km/h) | HIGH SPEED (31km/h) | HIGH SPEED (32km/h) | HIGH SPEED (30km/h) | HIGH SPEED (35km/h) | HIGH SPEED (30km/h) | HIGH SPEED (42km/h) | HIGH SPEED (43km/h) | HIGH SPEED (41km/h) | LOW SPEED (41km/h) | LOW SPEED (38km/h) | LOW SPEED (35km/h) | ... |
| XXXXXX | C | ... | HIGH SPEED (35km/h) | HIGH SPEED (30km/h) | HIGH SPEED (42km/h) | LOW SPEED (41km/h) | LOW SPEED (38km/h) | LOW SPEED (0km/h) | LOW SPEED (0km/h) | LOW SPEED (0km/h) | LOW SPEED (38km/h) | INTER-MITTENT (41km/h) | INTER-MITTENT (40km/h) | INTER-MITTENT (41km/h) | ... |
| XXXXXX | D | ... | HIGH SPEED (0km/h) | HIGH SPEED (0km/h) | HIGH SPEED (0km/h) | HIGH SPEED (40km/h) | HIGH SPEED (42km/h) | HIGH SPEED (42km/h) | HIGH SPEED (43km/h) | HIGH SPEED (41km/h) | HIGH SPEED (42km/h) | HIGH SPEED (43km/h) | HIGH SPEED (41km/h) | HIGH SPEED (40km/h) | ... |
| XXXXXX | E | ... | | | | | | | | | | HIGH SPEED (100km/h) | HIGH SPEED (95km/h) | HIGH SPEED (99km/h) | ... |

FIG. 11

| AREA ID (MESH CODE) | VEHICLE | STOP MODE | INTERMITTENT MODE | LOW SPEED MODE | HIGH SPEED MODE |
|---|---|---|---|---|---|
| XXXXXX | A | 0 | 0 | 0 | 12 |
| XXXXXX | B | 0 | 0 | 3 | 9 |
| XXXXXX | C | 0 | 3 | 6 | 3 |
| XXXXXX | D | 0 | 0 | 0 | 12 |
| XXXXXX | E | 0 | 0 | 0 | 1.5 |
| COUNT | | 0 | 3 | 9 | 37.5 |
| PROPORTION | | 0.000 | 0.060 | 0.182 | 0.758 |

FIG. 12

| AREA ID (MESH CODE) | VEHICLE | ... | 15:00:00 | 15:00:20 | 15:00:40 | 15:01:00 | 15:01:20 | 15:01:40 | 15:02:00 | 15:02:20 | 15:02:40 | 15:03:00 | 15:03:20 | 15:03:40 | ... |
|---|---|---|---|---|---|---|---|---|---|---|---|---|---|---|---|
| xxxxxx | A | ... | 23 | 24 | 23 | 15 | 14 | 15 | 13 | 20 | 21 | 14 | 17 | 15 | ... |
| xxxxxx | B | ... | 18 | 17 | 19 | 15 | 20 | 18 | 21 | 25 | 18 | 13 | 15 | 14 | ... |
| xxxxxx | C | ... | 34 | 30 | 25 | 19 | 16 | 13 | 12 | 13 | 16 | 13 | 12 | 9 | ... |
| xxxxxx | D | ... | 12 | 9 | 14 | 24 | 23 | 15 | 14 | 15 | 23 | 24 | 23 | 15 | ... |
| xxxxxx | E | ... |  |  |  |  |  |  |  |  |  | 45 | 44 | 46 | ... |

FIG. 13

| AREA ID (MESH CODE) | VEHICLE | INDEX FOR EACH VEHICLE (AVERAGE VALUE) |
|---|---|---|
| XXXXXX | A | 17.8 |
| XXXXXX | B | 17.8 |
| XXXXXX | C | 17.7 |
| XXXXXX | D | 17.6 |
| XXXXXX | E | 45 |

US 11,460,606 B2

PRECIPITATION INDEX ESTIMATION APPARATUS

INCORPORATION BY REFERENCE

The disclosure of Japanese Patent Application No. 2018-184595 filed on Sep. 28, 2018 including the specification, drawings and abstract is incorporated herein by reference in its entirety.

BACKGROUND

1. Technical Field

The present disclosure relates to a technology for estimating a precipitation index indicating an intensity of precipitation based on information acquired in a vehicle.

2. Description of Related Art

Japanese Unexamined Patent Application Publication No. 2012-215969 discloses a car navigation device that transmits, to a management device, information indicating whether a windshield wiper of a vehicle is being operated or not, together with current time information or current position information. By receiving the information indicating whether the windshield wiper of the vehicle is being operated or not, the management device sets the weather of an observation point at which a photovoltaic power generating device is installed.

SUMMARY

Conventionally, a service of presenting, to users, an estimated value of a current precipitation amount in each area has been provided. Particularly in recent years, sudden and localized heavy rains due to unstable atmospheric conditions often occur. There is therefore a need to estimate a current precipitation amount with high accuracy for disaster prevention, or the like.

The present disclosure provides a technology for estimating a precipitation index indicating an intensity of precipitation based on information acquired in a vehicle.

A precipitation index estimation apparatus according to an aspect of the disclosure includes a data collection unit and an estimation processing unit. The data collection unit is configured to collect rainfall amount data that is detected by a rainfall amount sensor in one or more vehicles positioned in a predetermined area within a predetermined period. The estimation processing unit is configured to estimate a precipitation index indicating an intensity of precipitation in the predetermined area within the predetermined period, based on the collected rainfall amount data.

With the above aspect, since the estimation processing unit estimates the precipitation index within the predetermined period based on the rainfall amount data actually detected within the predetermined period, the accuracy of estimating the precipitation index can be increased.

The estimation processing unit may include an index derivation unit configured to derive a rainfall amount index representing the collected rainfall amount data, and a precipitation index estimation unit configured to estimate the precipitation index from the rainfall amount index.

The estimation processing unit may include an index derivation unit configured to determine an index representing rainfall amount data for each vehicle, and derive, using the index, a rainfall amount index representing the rainfall amount data for the one or more vehicles, and a precipitation index estimation unit configured to estimate the precipitation index from the rainfall amount index.

When the number of pieces of the rainfall amount data detected in a vehicle, included in the one or more vehicles, within the predetermined period is less than a predetermined value, the index derivation unit need not determine the index representing the rainfall amount data for the vehicle.

With the foregoing aspect of the present disclosure, a technology for estimating a precipitation index based on information acquired in a vehicle can be provided.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a table illustrating examples of collected operation mode data;

FIG. 6 is a table illustrating results of counting the number of pieces of operation mode data, for each kind of operation mode;

FIG. 7 illustrates a precipitation level correspondence table;

FIG. 8 illustrates a weight correspondence table;

FIG. 9 is a table illustrating an exemplified operation mode of each vehicle;

FIG. 10 is a table illustrating vehicle speed at the time at which the operation mode data is acquired;

FIG. 11 is a table illustrating results of counting the number of pieces of operation mode data, for each kind of operation mode;

FIG. 12 is a table illustrating examples of collected rainfall amount data; and

FIG. 13 is a table illustrating an example of an index derived for each vehicle.

DETAILED DESCRIPTION OF EMBODIMENTS

Figure 1:
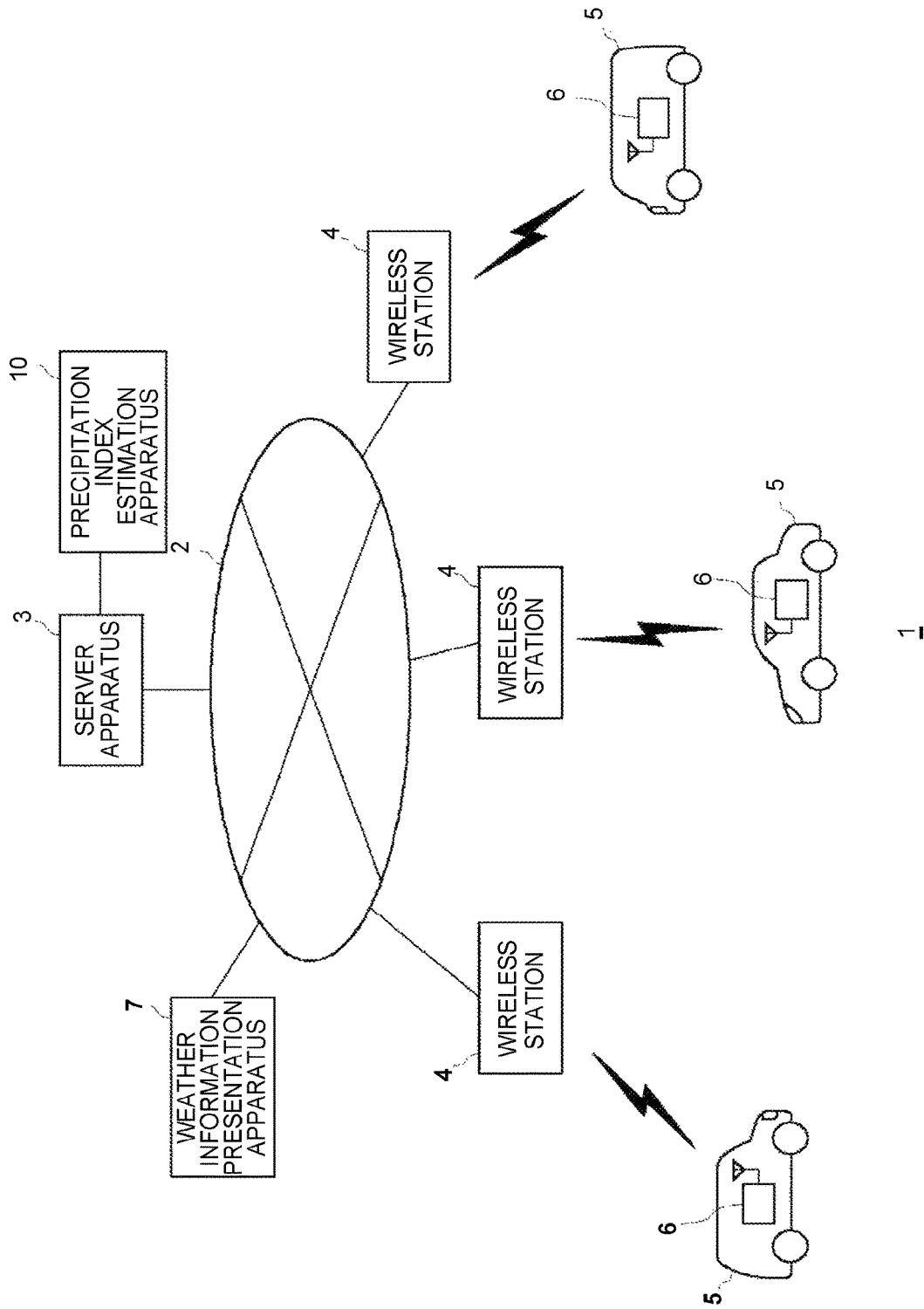
FIG. 1 is a diagram illustrating an overview of an information processing system according to an embodiment.

FIG. 1 illustrates an overview of an information processing system 1 according to an embodiment. The information processing system 1 includes a server apparatus 3, a precipitation index estimation apparatus 10 connected to the server apparatus 3, a weather information presentation apparatus 7 that presents weather information to users, a plurality of wireless stations 4, and a plurality of vehicles 5. The server apparatus 3, the weather information presentation apparatus 7, and the wireless stations 4 may be connected to one another via a network 2, such as the Internet.

A control device 6 mounted on each vehicle 5 has a wireless communication function, and is connected to the server apparatus 3 via the wireless station 4, which is a base station. The number of vehicles 5 is not limited to three. In the information processing system 1 according to the present embodiment, it is assumed that a large number of vehicles 5 generate vehicle state information and periodically transmit the vehicle state information to the server apparatus 3.

The server apparatus 3 is installed in a data center, and receives the vehicle state information transmitted from the control device 6 of each vehicle 5. The vehicle state information includes traffic information generated by an in-vehicle navigation device, and controller area network (CAN) information generated by an electronic control unit (ECU) or various sensors provided in the vehicle 5, and transmitted on the CAN. The precipitation index estimation apparatus 10 collects rain-related data included in the vehicle state information received by the server apparatus 3, and executes a process of estimating a precipitation index indicating an intensity of precipitation for each predetermined period. In the present embodiment, the process of estimating a precipitation index includes a process of estimating an index associated with a precipitation amount, and, for example, an estimated level of the precipitation may be derived. The server apparatus 3 and the precipitation index estimation apparatus 10 may be integrated with each other, and the server apparatus 3 may be equipped with a precipitation index estimation function of the precipitation index estimation apparatus 10.

The precipitation index estimation apparatus 10 estimates a precipitation index in each of a plurality of areas, for example, every four minutes, and provides the estimated precipitation index data to the weather information presentation apparatus 7 via the server apparatus 3. The server apparatus 3 and the weather information presentation apparatus 7 may be connected to each other via a dedicated line. Based on the precipitation index data transmitted from the precipitation index estimation apparatus 10, rain cloud conditions acquired from rain cloud radars installed across the country, or the like, the weather information presentation apparatus 7 generates an estimated value of a current precipitation amount in each of the plurality of areas, and presents the estimated value of the current precipitation amount to the users on a web page or the like. By taking into account the precipitation index data that is estimated by the precipitation index estimation apparatus 10 based on the vehicle state information, the weather information presentation apparatus 7 can acquire the estimated value of the current precipitation amount with high accuracy.

Figure 2A:
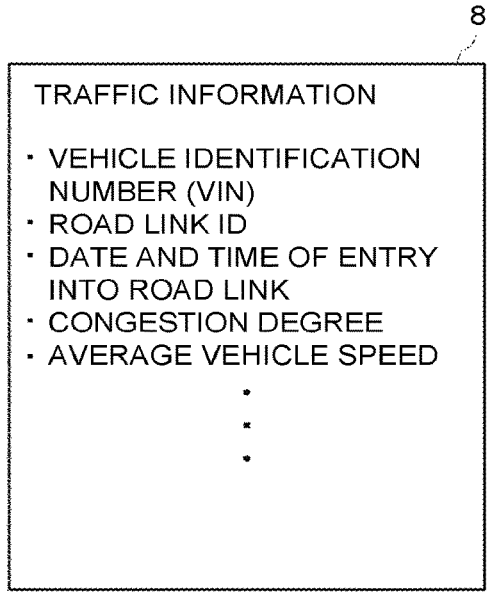
FIG. 2A is a list illustrating an example of vehicle state information.
Figure 2B:
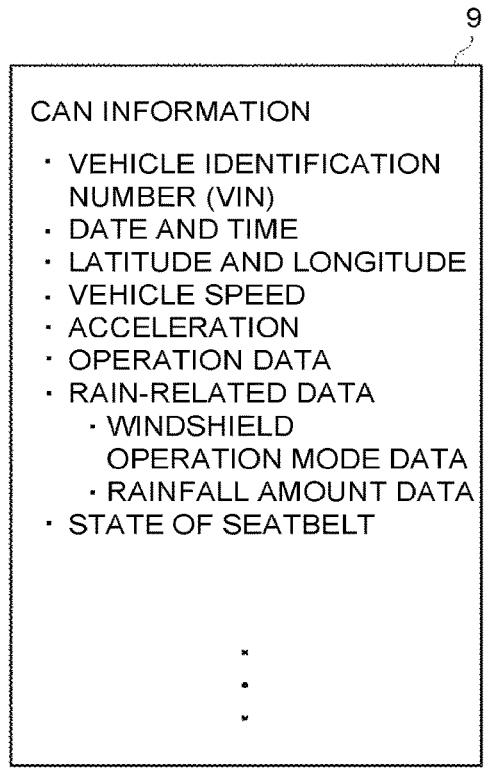
FIG. 2B is a list illustrating another example of the vehicle state information.

FIGS. 2A and 2B illustrate examples of the vehicle state information. The vehicle state information includes the traffic information 8 and the CAN information 9. FIG. 2A illustrates items included in the traffic information 8. The traffic information 8 includes items such as a vehicle identification number (VIN), an ID of a road link on which the vehicle 5 has travelled, a date and time of entry into the road link, a degree of congestion of the road on which the vehicle 5 has travelled, and an average vehicle speed. In the vehicle 5, the in-vehicle navigation device generates the traffic information 8. The control device 6 transmits the traffic information 8 to the server apparatus 3 at a predetermined first cycle. The first cycle may be several minutes. The transmitted traffic information 8 includes information on a road link that the vehicle 5 has passed after transmission of the last traffic information.

FIG. 2B illustrates items included in the CAN information 9. The CAN information 9 includes items such as a VIN, a date and time, a latitude and longitude, vehicle speed, acceleration, operation data, rain-related data, and a state of a seatbelt. The control device 6 acquires data on each item and generates the CAN information 9. The control device 6 transmits the CAN information 9 to the server apparatus 3 at a predetermined second cycle. The second cycle may be from several tens of seconds to one minute.

The data sampling cycle may vary depending on the item. For example, data on vehicle speed and data on acceleration may each be acquired at a cycle of several hundred milliseconds, and rain-related data may be acquired at a cycle of several tens of seconds. The data on each of the items, such as the vehicle speed, the acceleration, the operation data, the rain-related data, and the state of the seatbelt, is associated with the date and time at which the data is acquired and the latitude and longitude at which the data is acquired.

The rain-related data included in the CAN information 9 is used to estimate a precipitation index indicating an intensity of precipitation, and is used in the process of estimating the precipitation index, which is executed by the precipitation index estimation apparatus 10. In the present embodiment, the rain-related data includes operation mode data indicating an operation mode of a windshield wiper and/or data on a rainfall amount detected by a rainfall amount sensor.

The windshield wiper of each vehicle 5 is a device for wiping rain from the front windshield, or the like, and has a plurality of kinds of operation modes. The windshield wiper according to the present embodiment has the following four kinds of operation modes, and the operation mode data included in the CAN information 9 indicates an operation mode selected from the four kinds of operation modes.

(1) Stop Mode

In stop mode, an operation switch of the windshield wiper is off. In the stop mode, the windshield wiper does not operate.

(2) Intermittent Mode

In intermittent mode, the windshield wiper operates at regular intervals. The intermittent mode is often selected when the rainfall is light.

(3) Low-Speed Mode

In low-speed mode, the windshield wiper operates continuously at low speed. The low-speed mode is often selected when the rainfall is slightly heavy, such as when an hourly rainfall amount is 10 mm or more and less than 20 mm.

(4) High-Speed Mode

In high-speed mode, the windshield wiper operates continuously at high speed. The high-speed mode is often selected when the rainfall is of a high intensity, such as when the hourly rainfall amount is 20 mm or more.

The rainfall amount sensor is mounted on each vehicle 5 according to the present embodiment. The rainfall amount sensor (also referred to as a rain sensor) is attached to, for example, an upper portion of the front windshield. The rainfall amount sensor may include an infrared light emitting element, an infrared light receiving element, and a microcomputer that executes processes of controlling the emission of the light emitting element and detecting the rainfall amount. In the rainfall amount sensor, infrared light emitted from the light emitting element is reflected by the front windshield, and enters the light receiving element. However, when there are raindrops on the front windshield, some of the infrared light penetrates the windshield, and thus the amount of infrared light that enters the light receiving element decreases. Therefore, when there are a lot of raindrops on the windshield, the amount of light received by the light receiving element is relatively small, whereas when there are a few raindrops on the windshield, the amount of light received by light receiving element is relatively large. In this manner, the amount of light received by the light receiving element is correlated with the rainfall amount. The microcomputer has a function of detecting a rainfall amount (mm/h) from the amount of light received by light receiving element.

The rain-related data according to the present embodiment may include the operation mode data indicating an operation mode of the windshield wiper, may include data on a rainfall amount detected by the rainfall amount sensor, or may include both of them.

Figure 3:
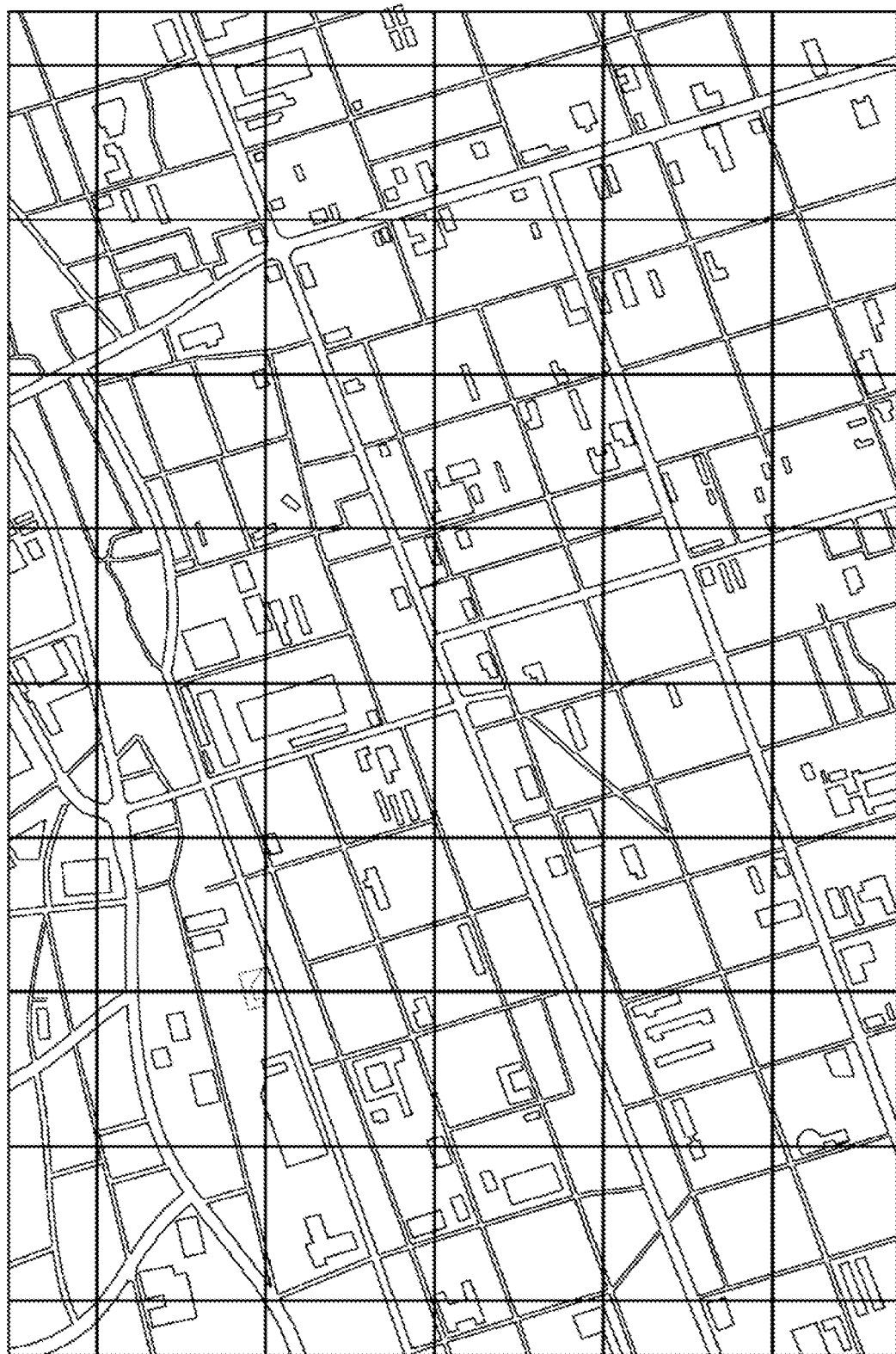
FIG. 3 is a diagram illustrating unit areas for each of which a precipitation index is estimated.

The precipitation index estimation apparatus 10 has a function of acquiring the vehicle state information transmitted from each vehicle 5 and estimating a precipitation index indicating an intensity of precipitation in a predetermined area within a predetermined period. FIG. 3 illustrates unit areas for each of which a precipitation index within a predetermined period is estimated. The precipitation index estimation apparatus 10 estimates a precipitation index within a predetermined period, for each of the unit areas defined by dividing a map with longitudinal lines and lateral lines. The map may be divided into a plurality of areas such that the areas have substantially the same size. Alternatively, the area size may vary depending on, for example, population density.

The map may be divided into a plurality of areas in any given method. In the example illustrated in FIG. 3, the map is divided into meshes of substantially the same size, based on latitude and longitude. For example, in Japan, there is a standard area mesh, set based on latitude and longitude, for use in statistics on each area. The precipitation index estimation apparatus 10 may use this standard area mesh as a unit area for estimation of a precipitation index. In addition, in the standard area mesh, a primary mesh to a tertiary mesh with different sizes are defined, and the length of one side of the tertiary mesh is about 1 km. The precipitation index estimation apparatus 10 may set the tertiary mesh as a unit area for estimation of a precipitation index, but a smaller mesh or a larger mesh may also be set as a unit area for estimation of a precipitation index.

Figure 4:
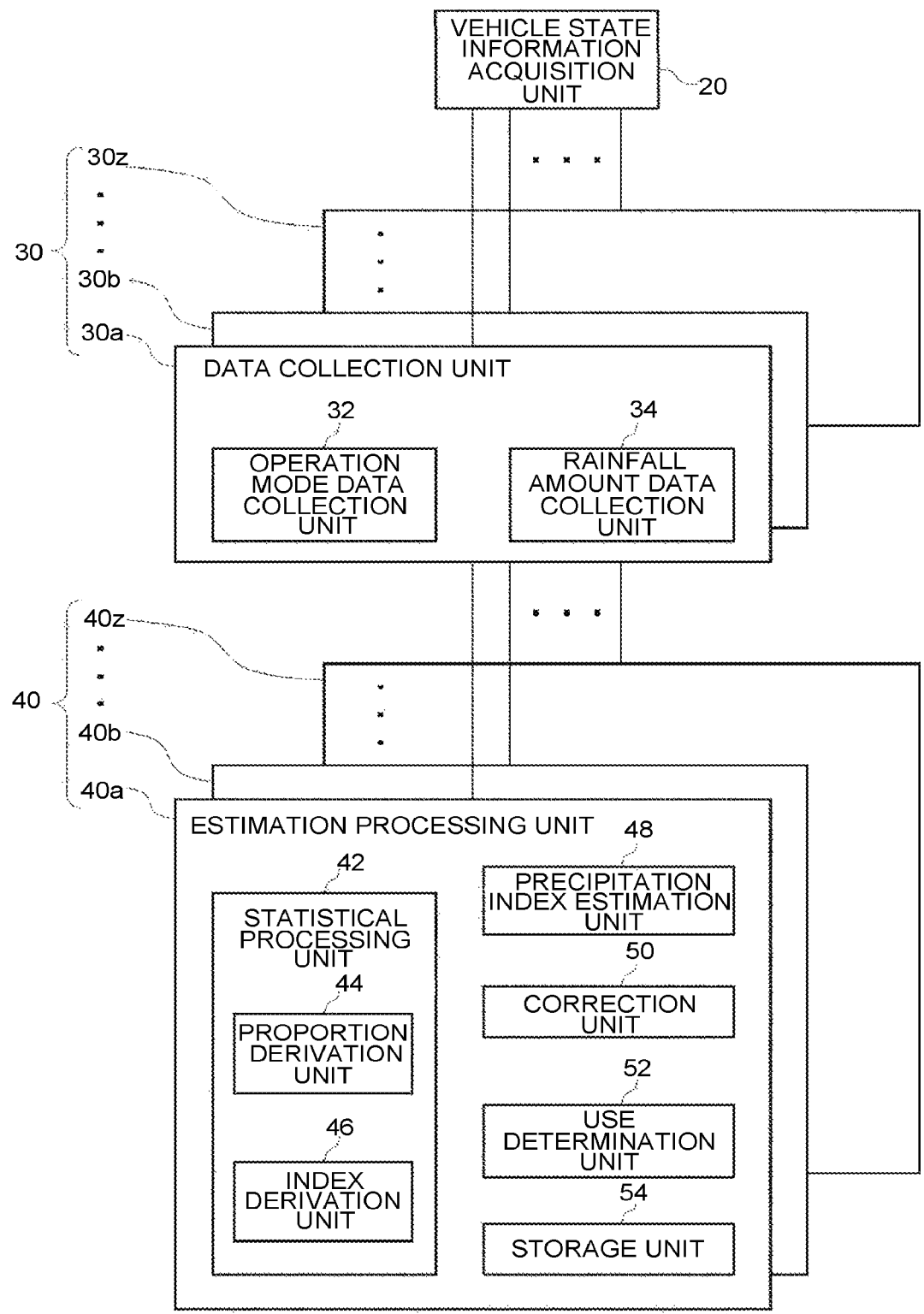
FIG. 4 is a diagram illustrating functional blocks of a precipitation index estimation apparatus.

FIG. 4 illustrates functional blocks of the precipitation index estimation apparatus 10. The precipitation index estimation apparatus 10 includes a vehicle state information acquisition unit 20, a plurality of data collection units 30a, 30b, . . . , 30z (hereinafter referred to as a "data collection unit 30", unless otherwise specifically distinguished), and a plurality of estimation processing units 40a, 40b, . . . , 40z (hereinafter referred to as an "estimation processing unit 40", unless otherwise specifically distinguished). The data collection unit 30 has a function of collecting rain-related data within a predetermined period. The estimation processing unit 40 has a function of statistically processing the collected rain-related data, thereby estimating a precipitation index indicating an intensity of precipitation within the predetermined period.

The data collection unit 30 includes an operation mode data collection unit 32 and a rainfall amount data collection unit 34. The estimation processing unit 40 includes a statistical processing unit 42, a precipitation index estimation unit 48, a correction unit 50, a use determination unit 52, and a storage unit 54. The statistical processing unit 42 has a function of statistically processing the rain-related data, and includes a proportion derivation unit 44 and an index derivation unit 46.

Each function of the precipitation index estimation apparatus 10 may be implemented by a large-scale integration (LSI) including a circuit block, a memory, and other elements in terms of hardware, and may be implemented by system software, an application program, or the like, loaded in the memory, in terms of software. Therefore, a person skilled in the art would understand that each function of the precipitation index estimation apparatus 10 may be implemented in various forms, by hardware only, by software only, or by a combination of hardware and software, and is not limited to any one thereof.

The vehicle state information acquisition unit 20 acquires all the vehicle state information received by the server apparatus 3. When the server apparatus 3 receives the vehicle state information from the vehicle 5 and stores it in a designated storage device, the vehicle state information acquisition unit 20 may immediately read and thereby acquire the vehicle state information from the storage device. When the precipitation index estimation apparatus 10 is provided as one function of the server apparatus 3, the vehicle state information acquisition unit 20 may receive the vehicle state information from a receiving unit of the server apparatus 3.

A combination of one data collection unit 30 and one estimation processing unit 40 is allocated to one unit area. For example, a combination of the data collection unit 30a and the estimation processing unit 40a is assigned to estimation of a precipitation index of a first area, and a combination of the data collection unit 30b and the estimation processing unit 40b is assigned to estimation of a precipitation index of a second area. Therefore, the number of combinations of the data collection unit 30 and the estimation processing unit 40 may be equal to the number of areas that are defined by dividing the map.

The data collection unit 30 collects rain-related data for estimating a precipitation index within a predetermined period, from the vehicle state information generated in one or more vehicles. Specifically, the data collection unit 30 collects the rain-related data acquired in an area to which it is allocated, from the CAN information 9 that is acquired by the vehicle state information acquisition unit 20. As illustrated in FIG. 2B, the rain-related data is associated with the date and time at which the rain-related data is acquired and the latitude and longitude at which the rain-related data is acquired, and the data collection unit 30 collects the rain-related data associated with the latitude and longitude of the area to which the data collection unit 30 is allocated.

First Embodiment

In a first embodiment, the operation mode data collection unit 32 collects the operation mode data indicating an operation mode of the windshield wiper, which is acquired in one or more vehicles positioned in a predetermined area within a predetermined period. Based on a proportion of each of a plurality of kinds of operation modes, which is derived from the collected operation mode data, the precipitation index estimation unit 48 estimates a precipitation index indicating an intensity of precipitation in the predetermined area within the predetermined period. By using the proportion of each kind of operation mode, which is acquired by statistical processing, the precipitation index estimation unit 48 can estimate the precipitation index within the predetermined period with high accuracy.

FIG. 5 illustrates an example of the operation mode data collected by the operation mode data collection unit 32. The operation mode data collection unit 32 collects, from the vehicle state information acquired by the vehicle state information acquisition unit 20, the operation mode data acquired in one or more vehicles positioned in an area having an area ID, "XXXXXX", within a period from 15:00:00 to 15:03:59.

In the example illustrated in FIG. 5, there are five vehicles 5—vehicles A, B, C, D, and E—that travel in the area having the area ID, "XXXXXX", within the period from 15:00:00 to 15:03:59. Among the five vehicles 5, vehicles A, B, C, and D travel in the area for four minutes from 15:00:00 to 15:03:59, and vehicle E travels in the area from 15:03:00.

The proportion derivation unit 44 counts the number of pieces of the operation mode data, for each of the plurality of kinds of operation modes indicated in the collected operation mode data, and derives a proportion of each of the plurality of kinds of operation modes. FIG. 6 illustrates the results of counting the number of pieces of the operation mode data acquired in the vehicles, for each of the plurality of kinds of operation modes. For example, in vehicle A, none of the operation mode data indicating the stop mode, the operation mode data indicating the intermittent mode, and the operation mode data indicating the low-speed mode are acquired, and 12 pieces of the operation mode data indicating the high-speed mode are acquired, that is, the operation mode data indicating the high-speed mode is acquired 12 times, during the period of four minutes.

The proportion derivation unit 44 counts, for each of the plurality of kinds of operation modes, the number of times that the operation mode data is acquired in all the vehicles, as follows:

Stop mode: 0 time
Intermittent mode: 3 times
Low-speed mode: 9 times
High-speed mode: 39 times Based on the above counting results, the proportion derivation unit 44 derives a proportion of each of the plurality of kinds of operation modes, as follows:

Stop mode: 0.000
Intermittent mode: 0.059
Low-speed mode: 0.176
High-speed mode: 0.765

Based on the proportion of each of the plurality of kinds of operation modes, the precipitation index estimation unit 48 estimates a precipitation index in the area to which it is allocated, within the predetermined period.

FIG. 7 illustrates a precipitation level correspondence table stored in the storage unit 54. In the precipitation level correspondence table, an estimated precipitation level is defined for each operation mode. The precipitation index estimation unit 48 may read an estimated precipitation level corresponding to an operation mode with the highest proportion from the storage unit 54, and derive the estimated precipitation level as a precipitation index. In this example, since the proportion of the high-speed mode is the highest, the precipitation index estimation unit 48 reads the estimated precipitation level "heavy" from the storage unit 54, and thus determines that the precipitation level in an allocated area is "heavy".

Each estimation processing unit 40 estimates a precipitation index (in this example, a precipitation level) in the allocated area, from the operation mode data during the four minutes from 15:00:00 to 15:03:59. The precipitation index estimation apparatus 10 supplies, to the server apparatus 3, the precipitation index data for all the areas within the predetermined period, and the server apparatus 3 transmits the precipitation index data for all the areas to the weather information presentation apparatus 7. In the present embodiment, the precipitation index estimation apparatus 10 provides the precipitation index data for all the areas to the weather information presentation apparatus 7 every four minutes, so that the weather information presentation apparatus 7 can update real time weather information with high accuracy every four minutes, and present it to the users.

The precipitation index estimation unit 48 may estimate a precipitation index based on a result of another statistical processing executed by the statistical processing unit 42. With this estimation method, the precipitation index estimation unit 48 uses a windshield wiper operation mode index derived by the statistical processing, thereby increasing the accuracy of estimating the precipitation index.

Specifically, the index derivation unit 46 of the statistical processing unit 42 derives an operation mode index indicating a stage of the operation mode of the windshield wiper, based on the proportion of each of the plurality of kinds of operation modes. A weight for calculating the index is defined for each operation mode. The index derivation unit 46 may calculate an operation mode index indicating a stage of the operation mode, by multiplying the proportion of each operation mode by the weight for the operation mode, and adding up the values acquired through multiplication performed for all the operation modes.

FIG. 8 illustrates a weight correspondence table stored in the storage unit 54. In the weight correspondence table, a weight for calculating an index is defined for each operation mode. The index derivation unit 46 refers to the weight correspondence table and calculates, using the following calculation formula, an index (an operation mode index) indicating a stage of the operation mode. The minimum value of the operation mode index is 0, and the maximum value thereof is 10.

(Operation mode index)=Σ(proportion of each operation mode)×(weight of the operation mode)

An operation mode index is calculated using the proportion of each of the plurality of kinds of operation modes illustrated in FIG. 6, as follows.

(Operation mode index)=0.000×0+0.059×2+0.176×6+0.765×10=8.824

The operation mode index is used to estimate a precipitation index. The calculated index may be converted to an integer value by rounding off the decimal places.

When all the windshield wipers are operated in the high-speed mode, the operation mode index is the maximum value of 10. The calculated operation mode index expresses a degree of the operation state of the windshield wiper with respect to the maximum value, and is highly correlated to the precipitation amount. The precipitation index estimation unit 48 estimates a precipitation index in the allocated area within the predetermined period from the operation mode index derived by the index derivation unit 46. For example, when the weather information presentation apparatus 7 expresses the precipitation amount on a scale of level 1 to level 10 and presents it to the users, the precipitation index estimation unit 48 may derive, as precipitation index data, a level of the precipitation amount that corresponds to the operation mode index. The storage unit 54 may store a correspondence table illustrating a correspondence between the operation mode index and the level of the precipitation amount, and the precipitation index estimation unit 48 may derive the level of the precipitation amount to be used as the precipitation index, by referring to the correspondence table. In addition, the precipitation index estimation unit 48 may acquire the level of the precipitation amount by correcting the operation mode index with a predetermined correction function.

According to the above method, the proportion derivation unit 44 derives the proportion of each of the plurality of kinds of operation modes from all the operation mode data for the windshield wiper acquired within the predetermined period. With this statistical processing method, a tendency for selecting a windshield wiper operation mode within the predetermined period is derived.

Here, it is known that the operation mode of the windshield wiper tends to reflect a preference of a driver. For example, while some drivers select the high-speed mode in case of light rain, others select the low-speed mode in case of heavy rain. In the example illustrated in FIG. 5, although the high-speed mode is selected and maintained in vehicles A and D throughout the four minutes, the possibility that the drivers prefer the high-speed mode regardless of the intensity of the rain cannot be denied.

When a large number of pieces of operation mode data reflecting the driver's preference are acquired, estimation of a precipitation index is highly influenced by the driver's preference. Therefore, in order to reduce the influence to be exerted on estimation of a precipitation index by the number of pieces of acquired data, which varies among the vehicles 5, the following process may be executed. The proportion derivation unit 44 may determine one kind of operation mode for each vehicle. Then, for each kind of operation mode, the proportion derivation unit 44 counts the number of vehicles 5 for which the kind of operation mode is determined. The proportion derivation unit 44 then derives a proportion of each of the plurality of kinds of operation modes.

FIG. 9 illustrates an example of an operation mode determined for each vehicle. For each vehicle, the proportion derivation unit 44 may determine the operation mode indicated in the operation mode data which is acquired most frequently, as the operation mode of the vehicle. In the example illustrated in FIG. 9, the proportion derivation unit 44 determines the operation mode of each vehicle as follows:

Vehicle A: high-speed mode
Vehicle B: high-speed mode
Vehicle C: low-speed mode
Vehicle D: high-speed mode
Vehicle E: high-speed mode For each kind of operation mode, the proportion derivation unit 44 counts the number of vehicles for which the kind of operation mode is determined. The results of the counting are as follows:

Stop mode: 0
Intermittent mode: 0
Low-speed mode: 1
High-speed mode: 4

Based on the above counting results, the proportion derivation unit 44 derives a proportion of each of the plurality of kinds of operation modes as follows:

Stop mode: 0.000
Intermittent mode: 0.000
Low-speed mode: 0.200
High-speed mode: 0.800

Based on the proportion of each operation mode, the precipitation index estimation unit 48 estimates a precipitation index in the allocated area within the predetermined period. The precipitation index estimation unit 48 may read, from the storage unit 54, an estimated precipitation level for the operation mode with the highest proportion (see FIG. 7), and estimate a precipitation index. In this example, since the proportion of the high-speed mode is the highest, the precipitation index estimation unit 48 reads the estimated precipitation level "heavy" from the storage unit 54, and determines that the precipitation level in the allocated area is "heavy".

The precipitation index estimation unit 48 may estimate a precipitation index in the allocated area within the predetermined period, using an operation mode index derived by the index derivation unit 46. The index derivation unit 46 calculates the operation mode index according to the following calculation formula:

(Operation mode index)=(proportion of each operation mode)×(weight of the operation mode).

That is, the index derivation unit 46 calculates the operation mode index as follows:

(Operation mode index)=0.000×0+0.000×2+0.200× 6+0.800×10=8.4

The precipitation index estimation unit 48 estimates the precipitation index in the allocated area within the predetermined period from the operation mode index derived by the index derivation unit 46. As described above, the precipitation index estimation unit 48 may derive a level of the precipitation amount corresponding to the operation mode index, as the precipitation index data. The storage unit 54 may store a correspondence table illustrating a correspondence between the operation mode index and the precipitation level, and the precipitation index estimation unit 48 may derive the level of the precipitation amount by referring to the correspondence table. In addition, the precipitation index estimation unit 48 may acquire the level of the precipitation amount by correcting the operation mode index with a predetermined correction function.

In the above-described example in which the proportion derivation unit 44 determines one operation mode for each vehicle, when the number of pieces of operation data acquired in a vehicle within the predetermined period is less than a predetermined value, the proportion derivation unit 44 need not determine the operation mode for the vehicle. For example, in the example illustrated in FIG. 9, although 12 pieces of operation mode data are acquired in each of vehicles A to D, only three pieces of operation mode data are acquired in vehicle E. When the minimum number of samples necessary for determining the operation mode for a vehicle is 5, the proportion derivation unit 44 need not determine the operation mode for vehicle E in which less than 5 pieces of operation mode data are acquired. In this case, the proportion derivation unit 44 derives a proportion of each of the plurality of kinds of operation modes based on the operation modes of vehicles A to D.

Note that, it is known that the amount of raindrops hitting the front windshield varies depending on the vehicle speed. As the vehicle speed increases, the amount of raindrops hitting the front windshield increases, whereas as the vehicle speed decreases, the amount of raindrops hitting the front windshield decreases. Therefore, while the vehicle is travelling on a highway, the amount of raindrops hitting the front windshield increases even though rain is not so heavy, and accordingly the driver tends to operate the windshield wiper in the high-speed mode while the vehicle is travelling at high speed.

Therefore, even though the operating mode data for the windshield wiper indicates the high-speed mode, there are cases in which an actual precipitation amount is not large, depending on the vehicle speed at the time of acquiring the operation mode data. Therefore, before the statistical processing by the statistical processing unit 42, the correction unit 50 may correct the value of an operation mode data to be used for statistical processing, according to the vehicle speed at the time at which the operation mode data is acquired.

FIG. 10 illustrates the vehicle speed at the time of acquiring the operation mode data. The correction unit 50 corrects the value of an operation mode data such that as the vehicle speed at the time of acquiring the operation mode data is higher, the precipitation index estimated based on the operation mode data is smaller. The correction unit 50 may set only the operation mode data acquired when the vehicle is travelling at high speed, as the operation mode data to be corrected. Whether or not the vehicle is travelling at high speed may be determined based on whether the vehicle speed is equal to or higher than a predetermined vehicle speed (for example, 80 km/h).

In the example illustrated in FIG. 10, the correction unit 50 determines that vehicle E is travelling at high speed, and specifies the values of the three pieces of operation mode data for vehicle E as the operation mode data to be corrected. The correction unit 50 corrects the value of the operation mode data acquired when the vehicle is travelling at high speed, as below.

In the example described above, the proportion derivation unit 44 counts the number of pieces of the operation mode data acquired in all the vehicles, for each of the plurality of kinds of operation modes, and executes statistical processing for deriving the proportion of each kind of operation mode. In this statistical processing, the number of pieces of the operation mode data each indicating one kind of operation mode are counted, and thus one piece of the operation mode data is counted as one piece of operation mode data indicating one kind of operation mode in the counting process.

Before counting the number of pieces of the operation mode data, for each kind of operation mode, the correction unit 50 corrects one piece of the operation mode data acquired when the vehicle is travelling at high speed, to s (s<1) pieces. For example, when s is set to 0.5 (s=0.5), the proportion derivation unit 44 counts three pieces of the high-speed mode data acquired in vehicle E (in other words, the high-speed mode data is acquired three times in vehicle E) as 1.5 (=3×s) pieces.

FIG. 11 illustrates results of counting the number of pieces of the operation mode data acquired in the vehicles, for each of the plurality of kinds of operation modes. The correction unit 50 corrects one piece of the high-speed mode data acquired in vehicle E, to 0.5 pieces. Using the operation mode data corrected by the correction unit 50, the proportion derivation unit 44 counts, for each of the plurality of kinds of operation modes, the number of times that the operation mode data is acquired in all the vehicles, as follows:

Stop mode: 0 time
Intermittent mode: 3 times
Low-speed mode: 9 times
High-speed mode: 37.5 times The correction unit 50 corrects one piece of the operation mode data acquired in vehicle E to 0.5 pieces. As a result of the correction, the counted value of the high-speed mode data has changed from that in the counting results illustrated in FIG. 6. Based on the counting results illustrated in FIG. 11, the proportion derivation unit 44 derives a proportion of each of the plurality of kinds of operation modes, as follows:

Stop mode: 0.000
Intermittent mode: 0.060
Low-speed mode: 0.182
High-speed mode: 0.758

The precipitation index estimation unit 48 estimates a precipitation index in the allocated area within the predetermined period based on the proportion of each operation mode.

Based on the statistical processing results illustrated in FIG. 11, the index derivation unit 46 derives an operation mode index, as follows:

(Operation mode index)=0.000×0+0.060×2+0.182× 6+0.758×10=8.792

The operation mode index calculated based on the statistical processing results illustrated in FIG. 6 is 8.824. It can be seen that the operation mode index calculated based on the statistical processing results illustrated in FIG. 11 is lower than that calculated based on the statistical processing results illustrated in FIG. 6. In such a manner, when the vehicle speed at the time of acquiring the operation mode data is high, the correction unit 50 may correct the value used for the statistical processing of the operation mode data, so that the operation mode index derived by the statistical processing unit 42 is smaller than the operation mode index before the correction. As such, the statistical processing unit 42 can derive statistical processing results with high accuracy.

There are some exceptional operation states of the windshield wiper when it is raining. For example, when the vehicle 5 is travelling in a tunnel, the driver does not operate the windshield wiper. Therefore, the operation mode data acquired while the vehicle is travelling in a tunnel indicates the stop mode. However, this operation mode does not reflect the weather condition. Therefore, the use determination unit 52 determines whether to use the operation mode data for the statistical processing, based on the road on which the vehicle is travelling at the time of acquiring the operation mode data.

By using the road link ID included in the traffic information 8 and the latitude and longitude included in the CAN information 9, the use determination unit 52 determines whether the vehicle 5 is travelling on a road on which the operation of the windshield wiper is not necessary (a windshield wiper-free road) at the time of acquiring the operation mode data. The windshield wiper-free road is typically a tunnel, but examples of the windshield wiper-free road also include a road located below an elevated road. The use determination unit 52 may determine whether the vehicle 5 is travelling on a windshield wiper-free road at the time of acquiring the operation mode data, by specifying a road link from the road link ID and the position of the vehicle 5 on the road link from the latitude and longitude, and referring to a map database. Further, in the map database, attribute data indicating a road kind, such as a tunnel or the like, is associated with a position on the road link.

When the vehicle 5 is travelling on the windshield wiper-free road, the use determination unit 52 determines to exclude the operation mode data from the statistical processing. On the other hand, when the vehicle 5 is travelling on a road that is not a windshield wiper-free road, the use determination unit 52 determines to include the operation mode data acquired in the corresponding vehicle 5 in the statistical processing, that is, to use the operation mode data for the statistical processing. As such, the use determination unit 52 determines whether the operation mode data is to be used, so that the statistical processing unit 42 can appropriately execute the statistical processing using the operation mode data reflecting weather conditions.

Second Embodiment

In a second embodiment, the rainfall amount data collection unit 34 collects rainfall amount data that is detected by the rainfall amount sensor, in one or more vehicles positioned in a predetermined area within a predetermined period. Based on the collected rainfall amount data, the precipitation index estimation unit 48 estimates a precipitation index indicating an intensity of precipitation in the predetermined area within the predetermined period.

FIG. 12 illustrates an example of the rainfall amount data collected by the rainfall amount data collection unit 34. In FIG. 12, a value of the rainfall amount data shown at each time indicates the rainfall amount (mm/h) detected by the rainfall amount sensor. The rainfall amount data collection unit 34 collects, from the vehicle state information acquired by the vehicle state information acquisition unit 20, the rainfall amount data acquired in one or more vehicles positioned in an area having an area ID, "XXXXXX", within a period from 15:00:00 to 15:03:59.

In the example illustrated in FIG. 12, there are five vehicles 5—vehicles A, B, C, D, and E—that travel in the area having the area ID, "XXXXXX", within the period from 15:00:00 to 15:03:59. Among the five vehicles 5, vehicles A, B, C, and D travel in the area for four minutes from 15:00:00 to 15:03:59, and vehicle E travels in the area from 15:03:00.

The index derivation unit 46 derives a rainfall amount index representing the collected rainfall amount data. The index derivation unit 46 may derive an average value of the rainfall amount within the predetermined period, as a rainfall amount index. In the example illustrated in FIG. 12, the average value of the rainfall amount is calculated to be 19.3 mm/h.

The precipitation index estimation unit 48 estimates a precipitation index in the allocated area within the predetermined period, from the rainfall amount index derived by the index derivation unit 46. The precipitation index estimation unit 48 may correct the average value of the rainfall amount with a predetermined correction function, thereby estimating a precipitation index.

As described in the first embodiment, the amount of raindrops hitting the front windshield varies depending on the vehicle speed. For this reason, there is a possibility that, while the vehicle is travelling, the rainfall amount sensor may detect a rainfall amount (mm/h) that is larger than the actual precipitation amount. Therefore, the precipitation index estimation unit 48 may estimate a precipitation index within a predetermined period by taking into account the vehicle speed at the time of acquiring the rainfall amount data. For example, the precipitation index estimation unit 48 may calculate an average value Vave of the vehicle speed at the time of acquiring the rainfall amount data and estimate a precipitation index by multiplying the average value of the rainfall amount (19.3 mm/h) by a correction coefficient α (α<1) acquired from the average value Vave of the vehicle speed. The higher the average value Vave of the vehicle speed is, the smaller the correction coefficient α is calculated. As such, in the second embodiment, the index derivation unit 46 derives a rainfall amount index representing the collected rainfall amount data, and the precipitation index estimation unit 48 estimates a precipitation index from the rainfall amount index. In the second embodiment, by using a value detected by the rainfall amount sensor, the index derivation unit 46 can estimate a precipitation index within a predetermined period with high accuracy.

Furthermore, the index derivation unit 46 may derive a median value or mode value of the rainfall amount within the predetermined period, as a rainfall amount index.

In the above method, the index derivation unit 46 derives, from all the rainfall amount data acquired within a predetermined period, an index representing the rainfall amount data. Through this statistical processing method, a tendency of the rainfall amount data within the predetermined period is derived.

There is a possibility that the rainfall amount sensor mounted on each vehicle 5 may differ in terms of detection characteristics, depending on the sensor sensitivity or the manner in which the rainfall amount sensor is mounted on the vehicle 5. Therefore, when a large number of pieces of rainfall amount data detected by a rainfall amount sensor that does not have appropriate detection characteristics are acquired, estimation of a precipitation index is highly influenced by the values detected by this rainfall amount sensor. Therefore, in order to reduce the influence to be exerted on estimation of a precipitation index by the number of pieces of acquired data, which varies among the vehicles 5, the following process may be executed. The index derivation unit 46 may first determine an index representing the rainfall amount data for each vehicle, and then use the index for each vehicle to derive an index representing the rainfall amount data for the plurality of vehicles.

FIG. 13 illustrates an example of an index derived for each vehicle. The index derivation unit 46 derives an average value of the rainfall amount within the predetermined period as an index for each vehicle. In the example illustrated in FIG. 13, the index derivation unit 46 determines the index of each vehicle, as follows:

Vehicle A: 17.8 (mm/h)
Vehicle B: 17.8 (mm/h)
Vehicle C: 17.7 (mm/h)
Vehicle D: 17.6 (mm/h)
Vehicle E: 45 (mm/h)

Using the index of each vehicle, the index derivation unit 46 derives a rainfall amount index representing the rainfall amount data for the plurality of vehicles. When an average value of the indices of all the vehicles is used as an index, the index representing the rainfall amount data for all the vehicles is 23.2 (mm/h). The index derivation unit 46 may derive a median value or mode value of the rainfall amount within the predetermined period as an index.

The precipitation index estimation unit 48 estimates a precipitation index in the allocated area within the predetermined period, from the rainfall amount index derived by the index derivation unit 46. The precipitation index estimation unit 48 may correct the average value of the rainfall amount with a predetermined correction function, thereby estimating a precipitation index.

In the above-described example in which the index derivation unit 46 determines an index representing the rainfall amount data for each vehicle, when the number of pieces of rainfall amount data acquired in a vehicle within the predetermined period is less than a predetermined value, the index derivation unit 46 need not determine the index representing the rainfall amount data for the vehicle. For example, in the example illustrated in FIG. 12, although 12 pieces of rainfall amount data are acquired in each of vehicles A to D, only three pieces of rainfall amount data are acquired in vehicle E. When the minimum number of samples necessary for determining the index representing the rainfall amount data for a vehicle is 5, the index derivation unit 46 need not determine an index for vehicle E in which less than 5 pieces of rainfall amount data are acquired. In this case, the index derivation unit 46 derives a rainfall amount index representing the rainfall amount data within the predetermined period based on the indices for vehicles A to D.

In the second embodiment, in a similar manner to the first embodiment, before the statistical processing by the statistical processing unit 42, the correction unit 50 may correct the value of each piece of the rainfall amount data according to the vehicle speed at the time at which the rainfall amount data is acquired. The correction unit 50 corrects the value of the rainfall amount data such that as the vehicle speed at the time of acquiring the rainfall amount data is higher, the precipitation index estimated based on the rainfall amount data is smaller. The correction unit 50 may set only the rainfall amount data acquired while the vehicle is travelling at high speed, as the rainfall amount data to be corrected.

In the example illustrated in FIG. 12, the correction unit 50 determines that vehicle E is travelling at high speed, and specifies the values of the three pieces of rainfall amount data for vehicle E as the rainfall amount data to be corrected. The correction unit 50 may correct the value of the rainfall amount data by multiplying the value of the rainfall amount data by a correction coefficient β(β≤1) acquired from the vehicle speed at the time of acquiring the rainfall amount data. The higher the vehicle speed is, the smaller the correction coefficient β is calculated.

In addition, in the second embodiment, the correction unit 50 may specify all the rainfall amount data as the rainfall amount data to be corrected, and correct the rainfall amount data by multiplying the value of all the rainfall amount data by the correction coefficient β. When the vehicle speed is zero, the correction coefficient β may be one (β=1). Since the value detected by the in-vehicle rainfall amount sensor includes an error corresponding to the vehicle speed, the correction unit 50 may remove this error from the rainfall amount data, and thus the precipitation index estimation unit 48 can estimate a precipitation index with high accuracy.

In the similar manner to the first embodiment, the use determination unit 52 may determine whether to use the rainfall amount data for the statistical processing, based on the road on which the vehicle 5 is travelling at the time of acquiring the rainfall amount data. By using the road link ID included in the traffic information 8 and the latitude and longitude included in the CAN information 9, the use determination unit 52 determines whether the vehicle 5 is travelling on a road on which the operation of the windshield wiper is not necessary (a windshield wiper-free road) at the time of acquiring the rainfall amount data. The use determination unit 52 may determine whether the vehicle 5 is travelling on a windshield wiper-free road at the time of acquiring the rainfall amount data, by specifying a road link from the road link ID and the position of the vehicle 5 on the road link from the latitude and longitude When the vehicle 5 is travelling on the windshield wiper-free road, the use determination unit 52 determines to exclude the rainfall amount data from the statistical processing. On the other hand, when the vehicle 5 is travelling on a road that is not a windshield wiper-free road, the use determination unit 52 determines to include the rainfall amount data acquired in the corresponding vehicle 5 in the statistical processing, that is, to use the rainfall amount data for the statistical processing. As such, the use determination unit 52 determines whether the rainfall amount data is to be used, so that the statistical processing unit 42 can appropriately execute the statistical processing using the rainfall amount data reflecting weather conditions.

The present disclosure has been described based on the embodiments and a plurality of examples. The present disclosure is not limited to the above-described embodiments and examples, and variations such as design modifications, and the like, can be made based on the knowledge of those skilled in the art.

In the first embodiment, the estimation processing unit 40 estimates a precipitation index based on the operation mode data for the windshield wiper. In the second embodiment, the estimation processing unit 40 estimates a precipitation index based on the rainfall amount data detected by the rainfall amount sensor. In a modified example, the estimation processing unit 40 may estimate a precipitation index based on the operation mode data for the windshield wiper and the rainfall amount data.

Although all the vehicles 5 are provided with windshield wipers, it is assumed that not all the vehicles 5 are provided with rainfall amount sensors. Therefore, in the information processing system 1, there may be a vehicle 5 capable of transmitting both the operation mode data for the windshield wiper and the rainfall amount data to the server apparatus 3, and a vehicle 5 capable of transmitting only the operation mode data for the windshield wiper to the server apparatus 3. When the vehicle 5 can transmit both the operation mode data and the rainfall amount data, the estimation processing unit 40 may estimate a precipitation index, based on the rainfall amount data. The estimation processing unit 40 may generate first precipitation index data that is estimated based on the rainfall amount data and second precipitation index data that is estimated based on the operation mode data within the same period. By taking into account the first precipitation index data and the second precipitation index data, the estimation processing unit 40 may generate the precipitation index data to be provided to the weather information presentation apparatus 7.

What is claimed is:

1. A precipitation index estimation apparatus, comprising:
circuitry programmed to:
collect rainfall amount data that is detected by a rainfall amount sensor in one or more vehicles positioned in a predetermined area within a predetermined period;
determine an index representing rainfall amount data for each of the one or more vehicles;
derive, using the index, a rainfall amount index representing the rainfall amount data for the one or more vehicles; and
estimate a precipitation index indicating an intensity of precipitation in the predetermined area within the predetermined period from the rainfall amount index,
wherein when a number of pieces of the rainfall amount data detected in a vehicle included in the one or more vehicles within the predetermined period is less than a predetermined of number of pieces of data, the index representing the rainfall amount data for the vehicle is not determined and the index representing the rainfall amount data for other vehicles of the one or more vehicles whose corresponding number of pieces of the rainfall amount data are greater than or equal to the predetermined number of pieces of data are determined.

2. The precipitation index estimation apparatus according to claim 1, wherein when the number of pieces of the rainfall amount data detected in the vehicle within the predetermined period is less than the predetermined number of pieces of data and greater than zero, the index representing the rainfall amount data for the vehicle is not determined.

3. The precipitation index estimation apparatus according to claim 1, wherein when the number of pieces of the rainfall amount data detected in the vehicle within the predetermined period is less than the predetermined number of pieces of data and greater than zero, the index representing the rainfall amount data for the vehicle is not determined and the index representing the rainfall amount data for each of other vehicles of the one or more vehicles whose corresponding number of pieces of the rainfall amount data are greater than or equal to the predetermined number of pieces of data are determined.

* * * * *